US009208242B2

(12) United States Patent
Kindberg

(10) Patent No.: US 9,208,242 B2
(45) Date of Patent: Dec. 8, 2015

(54) METHOD AND APPARATUS FOR ENABLING INTERACTION BETWEEN A MOBILE DEVICE AND ANOTHER DEVICE

(75) Inventor: Timothy Kindberg, Bristol (GB)

(73) Assignee: QUALCOMM Incorporated, San Diego, CA (US)

(*) Notice: Subject to any disclaimer, the term of this patent is extended or adjusted under 35 U.S.C. 154(b) by 1199 days.

(21) Appl. No.: 12/525,397

(22) PCT Filed: Jan. 31, 2008

(86) PCT No.: PCT/US2008/001282
§ 371 (c)(1),
(2), (4) Date: Jul. 31, 2009

(87) PCT Pub. No.: WO2008/094645
PCT Pub. Date: Aug. 7, 2008

(65) Prior Publication Data
US 2010/0107092 A1    Apr. 29, 2010

(30) Foreign Application Priority Data

Jan. 31, 2007   (GB) ................... 0701774.2

(51) Int. Cl.
*G06F 17/30*     (2006.01)
*G06K 7/10*      (2006.01)
(Continued)

(52) U.S. Cl.
CPC ...... *G06F 17/30879* (2013.01); *G06K 7/10475* (2013.01); *G06K 17/0022* (2013.01); *G06K 7/0004* (2013.01)

(58) Field of Classification Search
CPC ............ G06F 17/30879; Y10S 379/91; G06K 17/0022–17/0029; G06K 2209/27; G06K 2207/1018; G06K 19/10–19/18; G06K 19/07701–19/07707; G06K 19/0716; G06K 19/0703; G06K 2017/0093; G06K 2017/0067; G06K 7/1092–7/1095; G06K 7/10475; G06K 7/10118–7/10128; G06K 7/016

USPC .................. 715/760; 709/203, 204; 235/462.01–462.49
See application file for complete search history.

(56) References Cited

U.S. PATENT DOCUMENTS 5,288,976 A * 2/1994 Citron et al. ............... 235/375
5,640,002 A * 6/1997 Ruppert ............... G06K 7/0008
                                                  235/383
(Continued)

FOREIGN PATENT DOCUMENTS

CA    2309561 A1 * 11/2000    ............... G06F 3/00
EP    1033656 A1 *  9/2000
(Continued)

OTHER PUBLICATIONS

Valkkynen, Pasi; Korhonen, Ilkka; Plomp, Johan; Tuomisto, Timo; Cluitmans, Luc; Ailisto, Heikki; Seppa, Heikki; "A User Interaction Paradigm for Physical Browsing and Near-Object Control Based on Tags;" Physical Interaction (PI03)—Workshop on Real World User Interfaces; Sep. 8, 2003; pp. 31-34.*
(Continued)

*Primary Examiner* — Eric Wiener
(74) *Attorney, Agent, or Firm* — Norton Rose Fulbright US LLP

(57) ABSTRACT

A user acquires a data item 36 in a mobile device 2, the data item representing, for example, the right to a digital asset. A web page 34 including bar code symbol 40 is displayed on the display 26 of a further device such as a PC 14. The bar code symbol codes a location of a resource. The mobile device 2 reads the bar code symbol 40 and sends data from the data item to the resource at the location coded by the bar code symbol. The further device 14 subsequently carries out an action using the data-item data received at the resource, or associated data; for example, the further device uses the data to fetch a related digital asset. In one embodiment the location coded by the bar code symbol is that of a database record uniquely associated with the symbol. In another embodiment, the location coded by the bar code symbol is the address on a local network of the further device 14.

29 Claims, 3 Drawing Sheets

(51) Int. Cl.
*G06K 17/00* (2006.01)
*G06K 7/00* (2006.01)

(56) References Cited

U.S. PATENT DOCUMENTS

| | | | | |
|---|---|---|---|---|
| 5,978,773 | A * | 11/1999 | Hudetz et al. | 705/23 |
| 6,012,102 | A * | 1/2000 | Shachar | 710/5 |
| 6,027,024 | A * | 2/2000 | Knowles | 235/472.01 |
| 6,137,950 | A * | 10/2000 | Yuen | 386/314 |
| 6,144,848 | A * | 11/2000 | Walsh et al. | 455/419 |
| 6,697,949 | B1 * | 2/2004 | Philyaw | G06F 17/30876 380/211 |
| 6,736,322 | B2 * | 5/2004 | Gobburu et al. | 235/462.46 |
| 6,871,780 | B2 * | 3/2005 | Nygren et al. | 235/375 |
| 6,993,573 | B2 * | 1/2006 | Hunter | 709/218 |
| 7,003,495 | B1 * | 2/2006 | Burger | G06F 21/6218 235/375 |
| 7,068,992 | B1 * | 6/2006 | Massie et al. | 455/403 |
| 7,243,233 | B2 * | 7/2007 | Kindberg et al. | 713/171 |
| 7,334,728 | B2 * | 2/2008 | Williams | 235/383 |
| 7,387,250 | B2 * | 6/2008 | Muni | 235/462.01 |
| 7,392,312 | B1 * | 6/2008 | Philyaw | G06F 17/30879 707/E17.032 |
| 7,441,706 | B1 * | 10/2008 | Schuessler et al. | 235/462.15 |
| 7,571,856 | B2 * | 8/2009 | Lo | 235/462.01 |
| 7,597,262 | B2 * | 10/2009 | Wang et al. | 235/462.09 |
| 7,735,734 | B2 * | 6/2010 | Skaaksrud et al. | |
| 7,798,417 | B2 * | 9/2010 | Snyder et al. | 235/494 |
| 8,317,618 | B2 * | 11/2012 | Malik | 463/42 |
| 8,407,220 | B2 * | 3/2013 | Fitzpatrick et al. | 707/736 |
| 2001/0011233 | A1 * | 8/2001 | Narayanaswami | 705/26 |
| 2001/0027472 | A1 * | 10/2001 | Guan | 709/203 |
| 2001/0035459 | A1 * | 11/2001 | Komai | G06K 17/0022 235/462.25 |
| 2002/0026426 | A1 * | 2/2002 | Bennett | 705/64 |
| 2002/0063150 | A1 * | 5/2002 | Nygren et al. | 235/375 |
| 2002/0102966 | A1 * | 8/2002 | Lev et al. | 455/412 |
| 2002/0145045 | A1 * | 10/2002 | Waxelbaum | 235/462.46 |
| 2002/0179709 | A1 * | 12/2002 | Mehler | 235/454 |
| 2002/0185537 | A1 * | 12/2002 | Konda | 235/462.01 |
| 2002/0194081 | A1 * | 12/2002 | Perkowski | 705/26 |
| 2003/0034399 | A1 * | 2/2003 | Wilz et al. | 235/462.45 |
| 2004/0010800 | A1 * | 1/2004 | Goci | 725/78 |
| 2004/0019535 | A1 * | 1/2004 | Perkowski | 705/27 |
| 2004/0025185 | A1 * | 2/2004 | Goci et al. | 725/92 |
| 2004/0122731 | A1 * | 6/2004 | Mannik et al. | 705/14 |
| 2004/0158871 | A1 * | 8/2004 | Jacobson | 725/115 |
| 2004/0173685 | A1 * | 9/2004 | Imade et al. | 235/487 |
| 2005/0004844 | A1 * | 1/2005 | Attia | 705/26 |
| 2005/0011957 | A1 * | 1/2005 | Attia et al. | 235/462.46 |
| 2005/0044179 | A1 | 2/2005 | Hunter | |
| 2005/0044235 | A1 * | 2/2005 | Balahura et al. | 709/227 |
| 2005/0082370 | A1 * | 4/2005 | Frantz et al. | 235/462.25 |
| 2005/0149399 | A1 * | 7/2005 | Fukunaga et al. | 705/14 |
| 2005/0154644 | A1 * | 7/2005 | Deakin et al. | 705/26 |
| 2005/0198095 | A1 * | 9/2005 | Du et al. | 709/200 |
| 2005/0199699 | A1 * | 9/2005 | Sato et al. | 235/375 |
| 2005/0242189 | A1 * | 11/2005 | Rohs | 235/462.46 |
| 2006/0002607 | A1 * | 1/2006 | Boncyk et al. | 382/165 |
| 2006/0011728 | A1 * | 1/2006 | Frantz et al. | 235/462.46 |
| 2006/0047639 | A1 * | 3/2006 | King et al. | 707/3 |
| 2006/0072779 | A1 * | 4/2006 | Erol | 382/100 |
| 2006/0091999 | A1 * | 5/2006 | Howarth | 340/10.3 |
| 2006/0144946 | A1 * | 7/2006 | Kuriyama et al. | 235/462.1 |
| 2006/0184613 | A1 * | 8/2006 | Stienessen et al. | 709/203 |
| 2007/0055550 | A1 * | 3/2007 | Courtney et al. | 705/3 |
| 2007/0063050 | A1 * | 3/2007 | Attia et al. | 235/462.46 |
| 2007/0104348 | A1 * | 5/2007 | Cohen | 382/100 |
| 2007/0124721 | A1 * | 5/2007 | Cowing et al. | 717/100 |
| 2007/0145138 | A1 * | 6/2007 | Snyder et al. | 235/462.01 |
| 2007/0162350 | A1 * | 7/2007 | Friedman | 705/26 |
| 2007/0233830 | A1 * | 10/2007 | Shah et al. | 709/223 |
| 2007/0279521 | A1 * | 12/2007 | Cohen | 348/376 |
| 2008/0039203 | A1 * | 2/2008 | Ackley et al. | 463/40 |
| 2008/0059060 | A1 * | 3/2008 | Irish et al. | 701/207 |
| 2009/0065567 | A1 * | 3/2009 | Lee et al. | 235/375 |
| 2009/0177717 | A1 * | 7/2009 | Meehan et al. | 707/204 |
| 2009/0294539 | A1 * | 12/2009 | Kim | 235/462.01 |
| 2009/0307232 | A1 * | 12/2009 | Hall | 707/10 |

FOREIGN PATENT DOCUMENTS

| | | |
|---|---|---|
| JP | H09204389 A | 8/1997 |
| JP | 2000-057079 A | 2/2000 |
| JP | 2007197960 A * | 8/2007 |
| WO | WO 98-24050 A1 | 6/1998 |

OTHER PUBLICATIONS

Roduner, Christof; Floerkemeler, Christian; Langhelnrich, Marc; Schwarzentrub, Beat; "Operating Appliances with Mobile Phones—Strengths and Limits of a Universal Interaction Device;" Pervasive Computing—5th International Conference, Pervasive 2007, Toronto, Canada, May 2007; Lecture Notes in Computer Science, vol. 4480, pp. 198-215.*

European Search Report for Application No. PCT/US2008/001282, Jul. 16, 2008.

Written Opinion for Application No. PCT/US2008/001282, Jul. 16, 2008.

* cited by examiner

METHOD AND APPARATUS FOR ENABLING INTERACTION BETWEEN A MOBILE DEVICE AND ANOTHER DEVICE

The present application is a national stage filing of PCT application number PCT/US2008/001282, having an international filing date of Jan. 31, 2008, which claims priority to patent application serial number GB 0701774.2, filed Jan. 31, 2007, both of which are incorporated by reference in their entireties.

The invention relates to a method and apparatus for enabling an interaction between a mobile device and another device.

Mobile devices including cameras may be used to capture images and these may then be processed by the mobile device. In one application, "ActivePrint" (www.activeprint.org) a mobile device reads a special printed symbol which links to on-line content. The special printed or electronically displayed symbol may be incorporated for example in point of sale displays, posters, or in magazines.

These symbols and hence the data encoded by the symbols are typically captured by mobile devices and therefore use of the data is essentially restricted to use with resources that may be accessed on the mobile device. However, many users prefer to carry out some activities from their fixed computers, not mobile devices. These include purchasing, or indeed any application for which the greater ease of use of a conventional computer is beneficial.

There is thus a use for a method and apparatus that enable a data item on a mobile device to be used, directly or indirectly, by another device such as a Personal Computer (PC).

According to the invention, there is provided a method according to claim 1.

In one example embodiment, a user acquires, in a mobile device, a data item representing the right to a digital asset. A web page including a bar code symbol is displayed on the display of a PC. The bar code symbol is created by a server and codes a unique identifier for each supplied instance of the web page. The mobile device reads the bar code symbol and causes a database to be updated with data from the data item, creating the database record if required. A script in the web page polls the database using the unique identifier as a key and when data is found in the database record corresponding to that unique identifier the PC is provided with that data, or related data, and uses it to load a new web page including the digital asset.

Alternatively, a local connection such as Bluetooth® or WiFi between the mobile device and PC is used to avoid the need to poll any database.

In embodiments, the method is used with a completely standard web browser. In this case, the coding symbol may represent a URI (Uniform Resource Identifier) including the unique identifier identifying the instance of the coding symbol displayed. The method may then include updating a database with reference to the unique identifier when data from the data item is received at the location coded by the coding symbol and running a script in the web page displaying the coding symbol. In particular, the script may poll another URI using a reference to the same unique identifier to determine when the database is updated. If the database has been updated with data-item data, that data or related data, is provided to the web browser to enable it to carry out an action such as loading a digital asset associated with the data item.

In an alternative arrangement, the coding symbol displayed by the web application may represent a local network address, for example a URI including the Bluetooth address of the computer running the web application. Then, the mobile device calls the Bluetooth URI to directly supply the web browser with the information of the data item, which can then access the digital asset represented by the data item by retrieving it.

For a better understanding of the invention, embodiments will now be described, purely by way of example, with reference to the accompanying drawings, in which.

Figure 1:
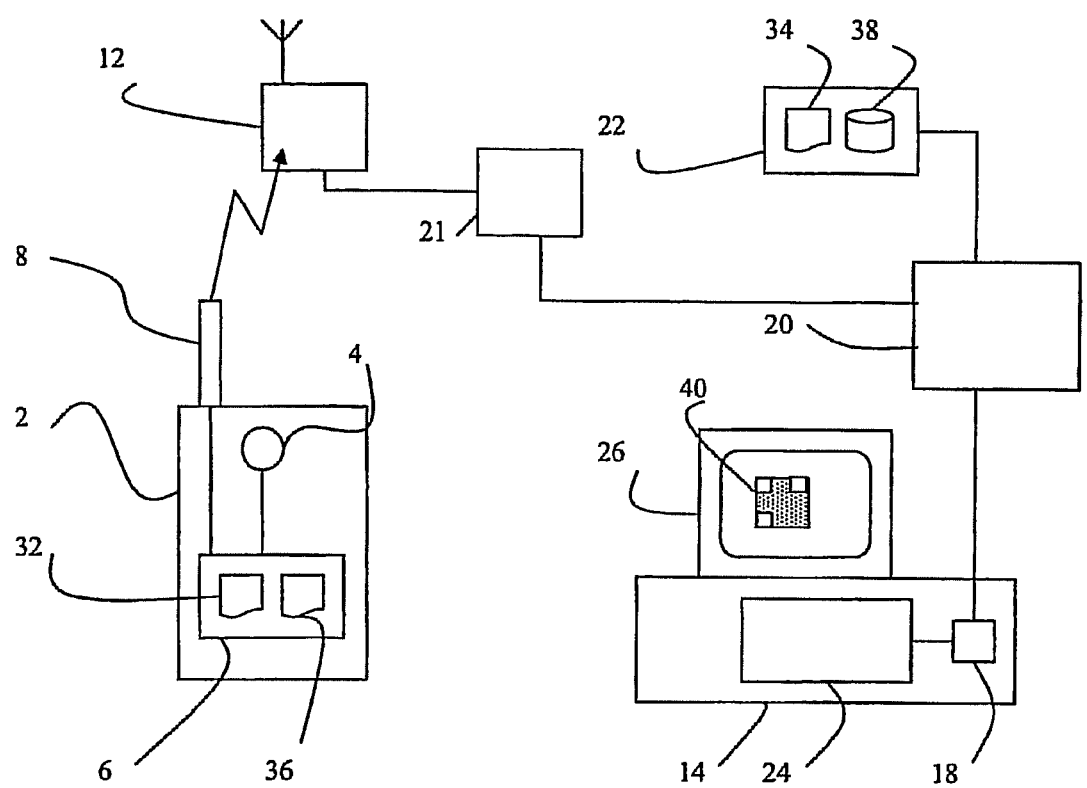
FIG. 1 shows a schematic drawing a first embodiment of the invention.

Referring to FIG. 1, a mobile device 2, in the embodiment a camera phone, includes a camera 4, processor 6 and an antenna 8. The mobile device is in radio connection with a base station 12. Bar code reading software 32 is installed on the mobile device 2.

A further device, which in the embodiment of FIG. 1 is a personal computer (PC) 14 includes a network connector 18 connecting the personal computer through a network 20 to a server 22. The base station 12 is also connected, for example through a public land mobile network 21 and network 20 to server 22. Conveniently, the network 20 may be the internet.

The PC 14 has a web browser 24 installed, which is arranged to display web pages 34 from server 22 on display 26.

In use, the user acquires a data item on the mobile device 2. The data item is simply a number, file, alphanumeric string or the like. This may represent a digital asset such as a downloadable music file. Alternatively or additionally, the data item may refer to some form of right, such as a right to a discount or the right to enter a particular location such as a nightclub. The data item can represent any right, asset or content that the user may wish to use. For example, the data item may be an alphanumeric string representing a tune from a music content provider in the form of "http://www.content.provider.com/tunes/tuneID=1234567", in other words, the data item in this case is a URI from where the content may be acquired.

The acquisition of data items on the mobile device may conveniently be done by reading barcodes using the barcode reading software 34. The barcodes may, for example, be barcodes representing coupons (data items) offering free content or discounts on purchases from a retailer. The barcodes may be printed on promotional literature, invoices, point of sale material in a retailer, or displayed on a web page.

Note that the term "bar code" is used in this specification to refer to any image containing data, for example alphanumeric data, including conventional bar codes, or two dimensional bar codes. Such bar codes are well known and include, for example QR or Datamatrix bar codes.

The invention is not restricted to the acquisition of data items using the barcode reader. Indeed, the data item can be acquired in many ways, for example by web surfing on the mobile device, or receiving an SMS message or email on the mobile device. The user may also acquire data items in other ways, for example by reading an RFID tag or even entering a alphanumeric code into a keypad of the mobile device.

Conveniently, the data item may be stored as a cookie 36 on the mobile device 2.

It will be appreciated that the mobile device may store more than one data item at any given time, these items generally being separately identifiable in some manner; for example, cookies are usually distinguished by the URI with which they are associated; in certain cases, however, it is possible that more than one data item is associated with the same identification element.

Regardless of how the user has acquired the data item (cookie 36) on the mobile device, the next stage is for the user to access the further device, here PC 14 and get a web page 34 from server 22. This web page 34 includes a barcode 40 which is unique to the individual PC 14, for example the server 22 supplies a barcode with a different unique identifier code every time the server is accessed. The unique identifier typically includes the address of the server 22 followed by a unique element; alternatively the server address can be separately encoded in the barcode.

The barcode also encodes a data-item indicator that indicates which of the possible multiple data items held by the mobile device is of interest. This data-item indicator may in appropriate cases be formed by a part of the unique identifier—for example, where the unique identifier includes the address of the server 22 and the data item is related to the server and includes data indicating this, then the server address included in the unique identifier can be used as the data-item indicator (this approach is particularly suited for a data item in the form of a cookie).

The web page 34 is supplied to PC 14 and the web browser 24 displays the barcode 40 on display 26.

The user then reads the barcode using the camera 4 on mobile device 2. In an optional arrangement, the user is then prompted to enter an access code such as a PIN number. This protects against unauthorised access to the rights represented. The access code is validated and the method stopped in the event that the validation fails.

Assuming that any validation is successful, the mobile device 2 then sends a message to server 22 via base station 12. In this embodiment, the message is sent via the public mobile network 21. The message includes part or all of the data of the cookie (data item) 36 and the unique identifier.

As already indicated, the address of the server 22 will typically be known to the mobile device 2 as a result of the server address being encoded in the barcode (either separately or as part of the unique identifier); however, it is also possible in certain applications for the server address to be a standard address known in advance to the mobile device 2.

When the server 22 receives the message with data from the cookie 36 and the unique identifier (though possibly without the component, if present, corresponding to the server address), the server stores the data from the cookie 36 in database 38 referenced by the unique identifier. The database 38 creates a data record corresponding to each unique identifier. In the present embodiment, the record is created when server 22 receives the data of the cookie 36. This minimises the amount of data stored on the database.

Alternatively, the database record may be created at another time, for example the data record may be created at the time that the server 22 creates the web page 34 with the unique identifier, and the record updated when the server receives the data of the cookie 36.

The web page on the PC 14 also includes a script which periodically polls the server 22, and in particular the database 38, using the unique identifier to determine if there is a database entry (a non-empty record) corresponding to the unique identifier, i.e. to determine whether the barcode 40 has been read by a mobile device 2 and the mobile device 2 has consequently supplied data from the cookie 36 to the database.

When there exists a database entry corresponding to the unique identifier, the server 20 returns in response to the polling by the webpage script, data comprising either the stored contents of the cookie or data derived by the processing of such contents by a server-side script run by server 22. In particular (but not exclusively), the returned data may be a URI originally stored in the cookie 36, or a URI determined by the server on the basis of the contents of the cookie (for example, the stored cookie data may be a reference code that is used by the server to look up a URI in a different database). Where a URI is returned to the PC 14, the returned URI typically points to a digital asset associated with the cookie 36 and the PC uses the returned URI to retrieve and present the digital asset to the user. For example, when the digital asset is a tune, the web browser of the PC 14 may automatically download the tune, or provide a control to download the tune.

The frequency with which the web page script polls the database 38 may be chosen to ensure that the delay in obtaining the desired data (the 'returned data' in the preceding paragraph) is not too long, without tying up too many resources.

The method is considerably easier for the user than many alternatives. For example, one alternative approach would be to display the digital asset on the screen of the mobile device as an alphanumeric string, and the user could type that number into PC 14. However, this would run a significant risk of transcription error.

An alternative approach would be to display a barcode on the display of mobile device 2 and to read that using a barcode reader on PC 14. However, this alternative would require the PC 14 to have a barcode reader, and most PCs in homes do not. Even in commercial environments, the cost of barcode readers is significant and it will often be preferred to avoid this cost.

Figure 2:
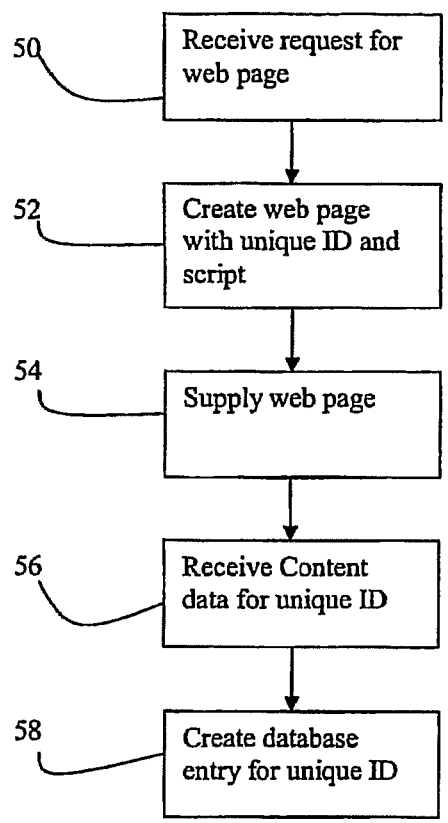
FIG. 2 shows a flow chart of the operation of the first embodiment of the invention.

The steps in the operation of the server 22 are shown in FIG. 2.

Firstly, in step 50, the server receives a request for a web page 34 from the PC 14.

The server 22 then creates (step 52) a unique web page including:
  a symbol encoding at least a unique ID for the specific request, and a data-item indicator (which, as already explained, may be part of the unique ID); and
  a script in the web page which when run on the user's PC 14 is arranged to cause that PC 14 to periodically poll database 38 with the unique ID.

The server supplies the web page to the requesting PC 14 (step 54).

After the mobile device 2 has read the web page 34 displayed on the PC 14, it sends a message including the unique ID (or at least a part of it) and data from the indicated data item 36. This message is received by the server 22 (step 56) and used to update the database 38 by adding the data from the data item to the database entry for the unique ID (step 58).

The web page script running on PC 14 periodically polls the server 22. The server, on being polled, determines whether data from the data item 36 has been loaded into the database 38, and, if so, the server returns either that data or data derived therefrom to the PC 14.

Thus, the method according to the embodiment of the invention just described greatly eases obtaining the data item data (or related data) on the PC compared with alternative approaches.

It should be noted that the database 38 need not reside at the server 22 providing the web pages 34; in this case, the unique identifier encoded in the symbol displayed on the PC 14 will include the database address rather than (or additionally to) the address of the server 22. Furthermore either the script in the web page 34 is arranged to poll the database 38 rather than the server 22, or the server 33 can be arranged, when polled, to contact the database 38.

Figure 3:
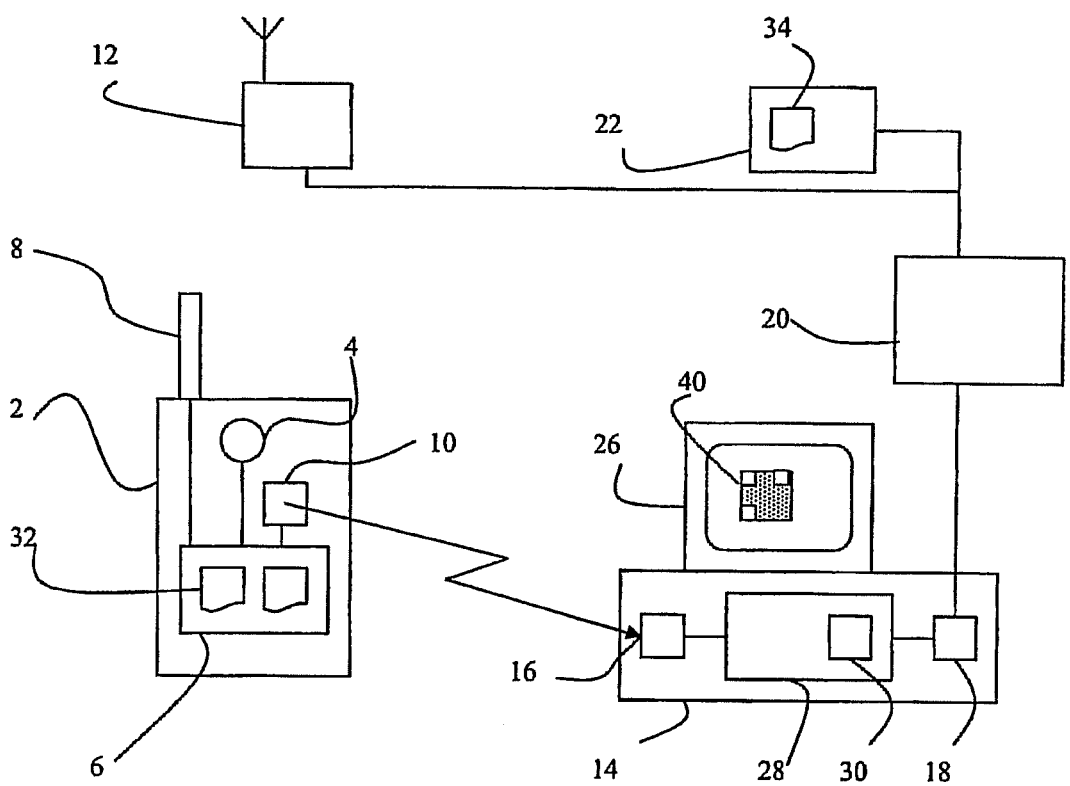
FIG. 3 shows a schematic drawing of a second embodiment of the invention.
Figure 4:
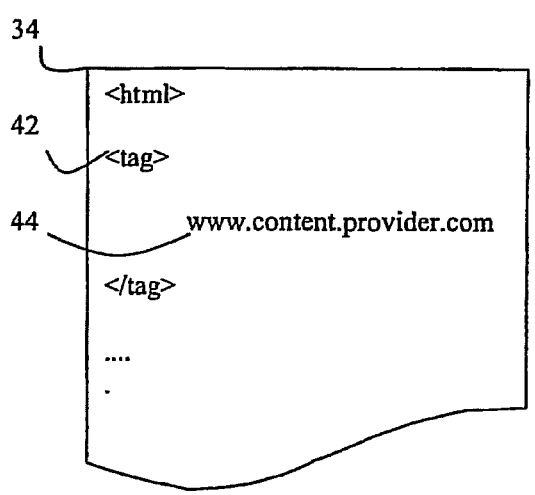
FIG. 4 illustrates part of a web page used in the second embodiment of the invention.

A second embodiment, illustrated in FIGS. 3 and 4, avoids the need to poll database 38 periodically from the web page. Instead, the second embodiment uses a local network connection between mobile device 2 and PC 14. In this embodiment, the connection is a Bluetooth connection between Bluetooth module 10 in mobile device 2 and Bluetooth module 16 in PC 14. It will be appreciated that alternative local network connections are possible, for example a WiFi connection.

In this embodiment, the barcode 40 displayed by PC 14 includes, instead of a unique identifier for a specific database record on server 22, an identifier giving the local network address of PC 14, for example the Bluetooth address of PC 14. As before, the barcode 40 also includes a data-item indicator identifying the data item of interest, for example by identifying the website 22 accessed by the PC 14. For example, the barcode 40 may code:

bt:00020e084a464:http/www.content.provider.com

On reading the barcode 40, the mobile device 2 finds any data items for the indicated website, in the example www.content.provider.com, and sends them via Bluetooth to the indicated Bluetooth address, i.e. to PC 14.

In order to preserve the privacy of the user of the PC, the webpage 34 on server 22 does not include the local Bluetooth address. Instead, the PC uses a modified browser 28 incorporating a module 30 which identifies, in certain web pages 34, a special tag pair 42 including a particular web address 44. The modified browser 28 replaces the special tag pair by a barcode symbol 40 including the local Bluetooth address of PC 14 and the web address 44 and displays it on display 26. FIG. 4 shows an example web page 34.

Note that the inclusion of the particular web address 44 in the barcode displayed on web page 34 allows the server supplying the content to be different to server 22, since the web address 44 need not be the same as that of server 22. However, in alternative embodiments the web address might be omitted and simply be replaced by the web address of the web page 34 at server 22.

When the PC 14 determines that it has received a data item from mobile device 2, it uses the data item to acquires the related digital asset (for example, the digital asset may be retrieved from the web address 44 using the data item as an access right, or the digital asset may be retrieved from a URI contained in the data item), and refreshes the displayed page on display 26 to present the digital asset.

The second embodiment avoids the need for a polling script in web page 34.

As can be seen, in both the first and second embodiments measures are taken at the PC to minimize the delay between receipt of the data-item data at the location coded by the coding symbol and the carrying out of an action at the PC using that data-item data or data derived therefrom. In the first embodiment these measures comprise the polling of the database to get the data needed to undertake the action as soon as the data-item data has been received at the database, whereas in the second embodiment the measures comprise using the data-item data as soon as it is received at the PC from the mobile device. However, in some embodiments, delay-minimisation measures are not provided; for example, in an embodiment similar to FIG. 1 for use where a data-item gives the user the right to a music digital asset and the use has an on-line repository for such assets, the transfer of the data item to the server 22 from the mobile device, can be arranged to cause the music digital asset to be loaded into the user's on-line repository for later access from the user's PC—in this case, there is no need for the PC to poll the server (though the user is preferably informed on his mobile device of the success (or otherwise) of the operation of transferring the data item from the mobile device to the server).

Those skilled in the art will realise many applications of the present invention. In particular, the present invention is particularly suited to coupon systems for providing digital content to a PC or to coupon systems for internet purchasing where the user acquires the coupon with a mobile device but requires to redeem it on another device.

Further, those skilled in the art will realise that many modifications to the embodiments are possible. For example, the database entry for each unique ID may be deleted after a certain time (e.g. one hour) and the unique ID reused. The database entry may be created only when the mobile device has read the barcode, or may be created when the symbol is displayed.

Further, although the above embodiments uses a PC with a web based application as a means for fetching a digital asset, this is not the only possibility. For example, the further device that displays the symbol could be a turnstile at a sports venue fitted with a display that grants access to the venue as the action taken in response to receiving the data item (in this case although the action taken does not itself use the data contained the data item transferred from the mobile device, the action is dependent on that data since this must be correct for access to be granted).

It is also envisaged that in certain cases, the use of a data-item indicator will not be required to be encoded in the displayed symbol, for example either because there will only be one data item or because the mobile device is arranged to send out all available data items with the selection of the appropriate item being made downstream (for example by the database 38, server 22 or the PC 14)

The invention claimed is:

1. A method of interacting between a mobile device and a second device,
    comprising:
        storing a data-item in the mobile device, wherein the mobile device and the second device are different devices, and wherein the data-item represents a right to a digital asset;
        reading, by the mobile device, a coding symbol displayed at a display of the second device, wherein the second device includes a web-based application, wherein the coding symbol includes an identifier uniquely associated with the second device; and
        transmitting a message from the mobile device to a server, wherein the message includes the identifier obtained from the coding symbol and the data-item, wherein transmission of the message updates a database to associate the identifier with the data-item, and wherein the second device uses the identifier included in the coding symbol to download the digital asset associated with the data-item to the second device using the web-based application after the message is transmitted from the mobile device to the server.

2. The method according to claim 1,
    wherein the coding symbol is displayed at the second device via a web page presented in the web-based application, and
    wherein the second device loads a new web page in the web-based application to download the digital asset.

3. The method according to claim 2, wherein the web page and the coding symbol are created by the server in response to receiving request from the second device.

4. The method according to claim 1, wherein the coding symbol represents a uniform resource indicator (URI) including the identifier.

5. The method according to claim 4,
wherein the second device runs a script that polls the database, using the identifier as a reference, to determine when the database has been updated, and
wherein the second device downloads the digital asset in response to a determination that the database has been updated.

6. The method according to claim 5, wherein the mobile device sends the message through a public mobile network.

7. The method according to claim 1, further comprising:
receiving an access code at the mobile device; and
providing the access code to the server to validate the access code, wherein the mobile device is prevented from updating the database if the access code is not valid.

8. The method according to claim 1, wherein the coding symbol includes information that identifies an address of the second device on a local network.

9. The method according to claim 8, wherein the local network is a Bluetooth network.

10. The method according to claim 1, wherein the mobile device stores a plurality of data-items, wherein the coding symbol includes a data-item indicator, and wherein the mobile device uses the data-item indicator to determine which of the plurality of data-items to include in the message.

11. A method of operating a web server to supply content to a second device, comprising:
receiving a request for a web page from the second device, wherein the second device includes a web-based application;
in response to receiving the request from the second device, supplying a web page to the second device, the web page including a bar code symbol and a script for polling the web server, wherein the bar code symbol includes an identifier uniquely associated with the second device, and wherein the script polls the web server using the identifier;
receiving, at the web server, a message from a mobile device, wherein the message includes the identifier and a data item stored at the mobile device, wherein the data item represents a right to a digital asset, wherein the identifier included in the message is obtained by the mobile device from the bar code symbol, and wherein the mobile device and the second device are different devices;
in response to receiving the message, updating, based on the message, a database to authorize the second device to access information associated with the data item;
determining, in response to being polled by the script with the identifier, whether the database has been updated by the mobile device; and
in response to a determination that the database has been updated by the mobile device, providing the information associated with the data item to the second device, wherein the information enables the second device to download the digital asset to the second device using the web-based application.

12. A method of operating a web-based application on a computer, comprising:
transmitting a request for a web page from the computer to a server, wherein the computer includes the web-based application;
receiving, by the computer responsive to the request, a web page from the server, the web page including a bar code symbol representing an identifier uniquely associated with the computer and a script for polling the server with the identifier;
displaying the bar code symbol on a display of the computer, wherein a mobile device obtains the identifier from the bar code symbol and uses the identifier to provide information associated with a data item to a database accessible to the server, wherein the data item represents a right to a digital asset, and wherein the mobile device and the computer are different devices;
polling, by the computer, the server using the script, wherein the script polls the server using the identifier to determine whether the mobile device has provided the information to the database, wherein the information is stored at the database in association with the identifier; and
in response to a determination by the polling that the mobile device has provided the information to the database, downloading, by the computer, the digital asset to the computer using the web-based application based on the information stored at the database in association with the identifier.

13. A non-transitory computer-readable storage medium storing instructions that, when executed by a processor, cause the processor to perform operations comprising:
storing a data-item in a mobile device, wherein the data-item represents a right to a digital asset;
reading, by the mobile device, a coding symbol displayed at a display of a second device, wherein the second device includes a web-based application, wherein the coding symbol includes an identifier uniquely associated with the second device, and wherein the mobile device and the second device are different devices; and
transmitting a message from the mobile device to a server, wherein the message includes the identifier obtained from the coding symbol and the data-item, wherein transmission of the message updates a database to associate the identifier with the data-item, and wherein the second device uses the identifier included in the coding symbol to download the digital asset associated with the data-item to the second device using the web-based application after the message is transmitted from the mobile device to the server.

14. The non-transitory computer-readable storage medium according to claim 13,
wherein the coding symbol is displayed at the second device via a web page presented in the web-based application, and
wherein the second device loads a new web page in the web-based application to download the digital asset.

15. The non-transitory computer-readable storage medium according to claim 14, wherein the web page and the coding symbol are created by the server in response to receiving a request from the second device.

16. The non-transitory computer-readable storage medium according to claim 15, wherein the coding symbol represents a uniform resource indicator (URI) including the identifier.

17. The non-transitory computer-readable storage medium according to claim 16 wherein:
transmission of the message updates the database to associate the identifier with the data-item,
the second device runs a script that polls the database, using the identifier as a reference, to determine when the database has been updated, and
the second device downloads the digital asset in response to a determination that the database has been updated.

18. The non-transitory computer-readable storage medium according to claim 13, wherein the mobile device sends the message through a public mobile network.

19. The non-transitory computer-readable storage medium according to claim 13, wherein the operations include:
receiving an access code at the mobile device; and
providing the access code to the server to validate the access code, wherein the mobile device is prevented from updating the database if the access code is not valid.

20. An apparatus comprising:
at least one processor configured to:
store a data-item in a mobile device, wherein the data-item represents a right to a digital asset;
initiate, at the mobile device, reading of a coding symbol displayed at a display of a second device, wherein the second device includes a web-based application, wherein the coding symbol includes an identifier uniquely associated with the second device, and wherein the mobile device and the second device are different devices; and
initiate transmission of a message from the mobile device to a server, wherein the message includes the identifier obtained from the coding symbol and the data-item, wherein transmission of the message updates a database to associate the identifier with the data-item, and wherein the second device uses the identifier included in the coding symbol to download the digital asset associated with the data-item to the second device using the web-based application after the message is transmitted from the mobile device to the server; and
a memory coupled to the processor.

21. The apparatus according to claim 20, wherein the at least one processor is configured to:
receive an access code; and
provide the access code to the server to validate the access code, wherein the mobile device is prevented from updating a database if the access code is not valid, wherein the second device is prevented from downloaded the digital asset until the database is updated.

22. An apparatus comprising:
means for storing a data-item in a mobile device, wherein the data-item represents a right to a digital asset;
means for reading, at the mobile device, a coding symbol displayed at a display of a second device, wherein the second device includes a web-based application, wherein the coding symbol includes an identifier uniquely associated with the second device, wherein the mobile device and the second device are different devices; and
means for transmitting a message from the mobile device to a server, wherein the message includes the identifier obtained from the coding symbol and the data-item, wherein transmission of the message updates a database to associate the identifier with the data-item, and wherein the second device uses the identifier included in the coding symbol to download the digital asset associated with the data-item to the second device using the web-based application after the message is transmitted from the mobile device to the server.

23. A non-transitory computer-readable storage medium storing instructions that, when executed by a processor, cause the processor to perform operations comprising:
receiving, at a web server, a request for a web page from a second device, wherein the second device includes a web-based application;
supplying a web page to the second device responsive to the request, the web page including a bar code symbol and a script for polling the server, wherein the bar code symbol includes an identifier uniquely associated with the second device;
receiving, at the web server, a message from a mobile device, wherein the message includes the identifier and a data item stored at the mobile device, wherein the data item represents a right to a digital asset, wherein the message includes the identifier obtained by the mobile device from the bar code symbol, and wherein the mobile device and the second device are different devices;
in response to receiving the message, updating, based on the message, a database to authorize the second device to access information associated with the data item;
determining, in response to being polled by the script with the identifier, whether the database has been updated by the mobile device; and
in response to a determination that the database has been updated by the mobile device, providing the information associated with the data item to the second device, wherein the information enables the second device to download the digital asset to the second device using the web-based application.

24. The non-transitory computer-readable storage medium of claim 23, wherein the operations include creating the web page and the coding symbol in response to receiving the request from the second device.

25. An apparatus comprising:
at least one processor configured to:
receive, at a web server, a request for a web page from a second device, wherein the second device includes a web-based application;
supply a web page to the second device responsive to the request, the web page including a bar code symbol and a script for polling the server, wherein the bar code symbol includes an identifier uniquely associated with the second device;
receive, at the web server, a message from a mobile device, wherein the message includes the identifier and a data item stored at the mobile device, wherein the data item represents a right to a digital asset, wherein the message includes the identifier obtained by the mobile device from the bar code symbol, and wherein the mobile device and the second device are different devices;
in response to receiving the message, update, based on the message, a database to authorize the second device to access information associated with the data item;
determine, in response to being polled by the script with the identifier, whether the database has been updated by the mobile device; and
in response to a determination that the database has been updated by the mobile device, provide the information associated with the data item to the second device, wherein the information enables the second device to download the digital asset to the second device using the web-based application; and
a memory coupled to the at least one processor.

26. An apparatus comprising:
means for receiving a request for a web page from a second device, wherein the second device includes a web-based application;
means for supplying a web page to the second device responsive to the request, the web page including a bar code symbol and a script for polling the server, wherein the bar code symbol includes an identifier uniquely associated with the second device;

means for receiving a message from a mobile device, wherein the message includes the identifier and a data item stored at the mobile device, wherein the data item represents a right to a digital asset, wherein the message includes the identifier obtained by the mobile device from the bar code symbol, and wherein the mobile device and the second device are different devices;

means for updating a database based on the message, wherein the updating authorizes the second device to access information associated with the data item;

means for determining whether the database has been updated by the mobile device in response to being polled by the script with the identifier; and means for providing the information associated with the data item to the second device in response to a determination that the database has been updated by the mobile device, wherein the information enables the second device to download the digital asset to the second device using the web-based application.

27. A non-transitory computer-readable storage medium storing instructions that, when executed by a processor, cause the processor to perform operations comprising:

transmitting a request for a web page from a computer to a server, wherein the computer includes a web-based application;

receiving, by the computer, a web page from the server, the web page including a bar code symbol representing an identifier uniquely associated with the computer and a script for polling the server with the identifier;

displaying the bar code symbol on a display of the computer, wherein a mobile device obtains the identifier from the bar code symbol and uses the identifier to provide information associated with a data item to a database accessible to the server, wherein the data item represents a right to a digital asset, and wherein the mobile device and the computer are different devices;

polling, by the computer, the server using the script, wherein the script polls the server using the identifier to determine whether the mobile device has provided the information to the database, wherein the information is stored at the database in association with the identifier; and in response to a determination by the polling that the mobile device has provided the information to the database, downloading, by the computer, the digital asset to the computer using the information stored at the database in association with the identifier using the web-based application.

28. An apparatus comprising:

at least one processor configured to:

transmit a request for a web page from a computer to a server, wherein the computer includes a web-based application;

receive a web page from the server responsive to the request, the web page including a bar code symbol representing an identifier uniquely associated with the computer and a script for polling the server with the identifier;

initiate display of the bar code symbol on a display of the computer, wherein a mobile device obtains the identifier from the bar code symbol and uses the identifier to provide information associated with a data item to a database accessible to the server, wherein the data item represents a right to a digital asset, and wherein the mobile device and the computer are different devices;

poll, by the computer, the server using the script, wherein the script polls the server using the identifier to determine whether the mobile device has provided the information to the database, wherein the information is stored at the database in association with the; and download, by the computer, the digital asset to the computer using the web-based application in response to a determination by the polling that the mobile device has provided the information to the database, wherein the digital asset is downloaded using the information stored at the database in association with the identifier; and a memory coupled to the at least on processor.

29. An apparatus comprising:

means for transmitting a request for a web page from a computer to a server, wherein the computer includes a web-based application;

means for receiving, at the computer responsive to the request, a web page from the server, the web page including a bar code symbol representing an identifier uniquely associated with the computer and a script for polling the server with the identifier;

means for displaying the bar code symbol on a display of the computer, wherein a mobile device obtains the identifier from the bar code symbol and uses the identifier to provide information associated with a data item to a database accessible to the server, wherein the data item represents a right to a digital asset, and wherein the mobile device and the computer are different devices;

means for polling, by the computer, the server using the script, wherein the script polls the server using the identifier to determine whether the mobile device has provided the information to the database, wherein the information is stored at the database in association with the identifier; and means for downloading, by the computer, the digital asset to the computer using the web-based application in response to a determination by the polling that the mobile device has provided the information to the database, wherein the digital asset is downloaded using the information stored at the database in association with the identifier, and wherein the means for downloading downloads the digital asset by loading a new web page in the web-based application.

* * * * *